United States Patent
Giacomini

(10) Patent No.: US 11,392,890 B2
(45) Date of Patent: *Jul. 19, 2022

(54) REFRIGERATOR WITH CONTENTS MONITORING SYSTEM

(71) Applicant: WHIRLPOOL CORPORATION, Benton Harbor, MI (US)

(72) Inventor: Neomar Giacomini, Saint Joseph, MI (US)

(73) Assignee: Whirlpool Corporation, Benton Harbor, MI (US)

(*) Notice: Subject to any disclaimer, the term of this patent is extended or adjusted under 35 U.S.C. 154(b) by 43 days.

This patent is subject to a terminal disclaimer.

(21) Appl. No.: 16/988,278

(22) Filed: Aug. 7, 2020

(65) Prior Publication Data

US 2020/0372454 A1 Nov. 26, 2020

Related U.S. Application Data

(63) Continuation of application No. 16/426,696, filed on May 30, 2019, now Pat. No. 10,740,720, which is a continuation of application No. 15/692,285, filed on Aug. 31, 2017, now Pat. No. 10,346,796.

(51) Int. Cl.
*G06Q 10/08* (2012.01)
*F25D 29/00* (2006.01)

(52) U.S. Cl.
CPC ........... *G06Q 10/087* (2013.01); *F25D 29/00* (2013.01); *F25D 29/008* (2013.01); *F25D 2700/12* (2013.01)

(58) Field of Classification Search
CPC ..... G06Q 10/087; F25D 29/00; F25D 29/008; F25D 2700/06; F25D 2700/12; F25D 2700/16

See application file for complete search history.

(56) References Cited

U.S. PATENT DOCUMENTS

| | | | |
|---|---|---|---|
| 8,275,665 B2 | 9/2012 | Bodin et al. | |
| 8,813,516 B2 | 8/2014 | Min et al. | |
| 9,767,432 B1* | 9/2017 | Brazeau | G06K 7/10861 |
| 10,346,796 B2* | 7/2019 | Giacomini | F25D 29/00 |
| 10,474,987 B2* | 11/2019 | Corona | G06K 9/6267 |
| 10,740,720 B2* | 8/2020 | Giacomini | G06Q 10/087 |
| 2010/0106625 A1 | 4/2010 | McCoy | |
| 2016/0033194 A1 | 2/2016 | Sumihiro et al. | |
| 2016/0201967 A1 | 7/2016 | Mitchell et al. | |
| 2016/0370107 A1 | 12/2016 | Moon et al. | |
| 2018/0224150 A1 | 8/2018 | Lewis et al. | |

FOREIGN PATENT DOCUMENTS

| | | |
|---|---|---|
| DE | 102013211097 A1 | 12/2014 |
| EP | 3128274 A1 | 2/2017 |
| JP | 09303939 A | 11/1997 |

* cited by examiner

*Primary Examiner* — Marc E Norman
(74) *Attorney, Agent, or Firm* — Brooks Kushman P.C.

(57) ABSTRACT

A refrigerating or food storage appliance for receiving containers within the appliance for storing a substance, the appliance including a cabinet at least partially defining an interior with an access opening, a door movably mounted to the cabinet to selectively open/close the access opening and at least partially defining the interior when the door selectively closes the access opening, at least one thermal imaging device for obtaining thermal image data of at least one container within the interior, and a control unit receiving the thermal image data.

22 Claims, 4 Drawing Sheets

REFRIGERATOR WITH CONTENTS MONITORING SYSTEM

CROSS-REFERENCE TO RELATED APPLICATION(S)

This application is a continuation of U.S. patent application Ser. No. 16/426,696, filed May 30, 2019, now U.S. Pat. No. 10,740,720 issued Aug. 11, 2020, which is a continuation of U.S. patent application Ser. No. 15/692,285, filed Aug. 31, 2017 now U.S. Pat. No. 10,346,796 issued Jul. 9, 2019, the contents of which are incorporated herein by reference in their entireties.

BACKGROUND OF THE INVENTION

In a refrigerator or other appliance for storing containers of food substances, which can be found within a kitchen environment, garages, bars, restaurants, and other places, there can be numerous containers of various types, sizes, and shapes that are configured to store all matter of food substances. It can be useful to know the amount of a food substance that is remaining within a container, in order to avoid food waste and in order to determine when it is or is not necessary to purchase additional quantities of a specific food substance. However, determining the amount of the food substance stored in the container can be difficult to ascertain.

Previous methods of determining amounts of food substances stored within containers in a refrigerator include estimating remaining contents based on the mass of the container, visual imaging of containers, and user input regarding consumption of the food substance. Estimating the contents of a container based on the mass requires many sensors to be provided in order to measure the mass of different containers, increasing production costs and complexity of the refrigerator. Visual imaging can require the use of transparent containers and result in inaccurate measurements when opaque containers are present. Requiring a user to input information places an extra burden on the user which is not desirable.

BRIEF SUMMARY OF THE INVENTION

In one aspect, illustrative embodiments in accordance with the present disclosure relate to a refrigerating appliance for receiving containers within the refrigerating appliance for storing a substance, the refrigerating appliance including a cabinet at least partially defining an interior with an access opening, a door movably mounted to the cabinet to selectively open/close the access opening and at least partially defining the interior when the door selectively closes the access opening, at least one thermal imaging device for obtaining thermal image data of at least one container within the interior, and a control unit receiving the thermal image data and programmed to analyze temperature differences of the container from the thermal image data and output an amount indicator indicative of the amount of a substance in the container.

In another aspect, illustrative embodiments in accordance with the present disclosure relate to a method of monitoring the contents of at least one container within an appliance for storing containers at a predetermined temperature, the method including activating at least one thermal imaging device positioned within or on the appliance to generate an image of at least a portion of the contents of the appliance, generating with the thermal imaging device a thermal image data of at least one container within the appliance, and analyzing the thermal image data to identify temperature differences of the container and determine an amount of a substance in the container.

DETAILED DESCRIPTION OF EMBODIMENTS OF THE INVENTION

Figure 1:
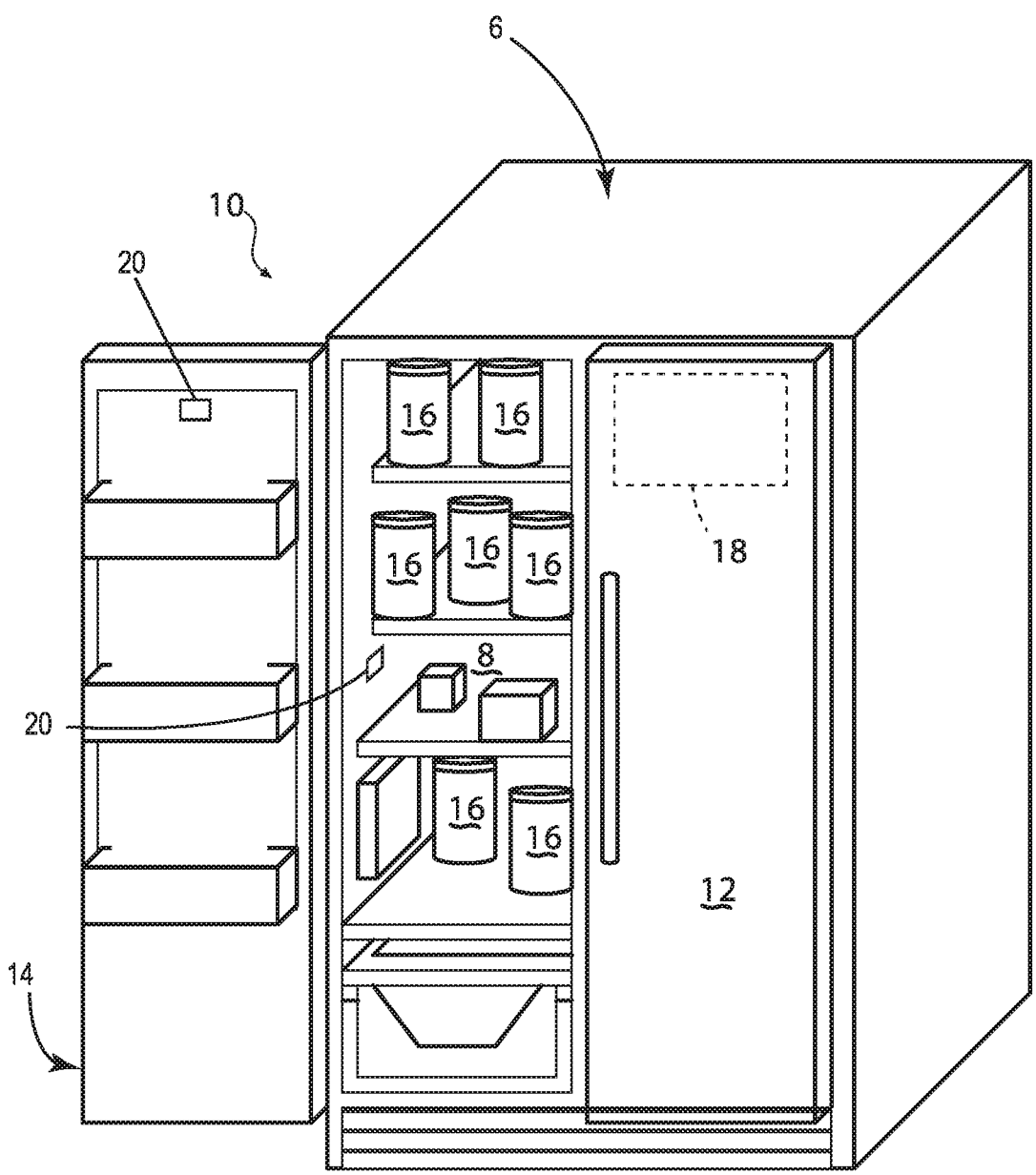
FIG. 1 illustrates a perspective partial view of a refrigerating appliance in the form of a refrigerator according to an embodiment of the present disclosure.

FIG. 1 illustrates a storage and consumption environment such as a kitchen 10 that can include a refrigerating or food storage appliance, illustrated herein as a refrigerator 12. The refrigerator 12 includes a cabinet 6 at least partially defining an interior 8 that can hold a plurality of containers 16. The cabinet 6 includes an access opening. The refrigerator 12 can also include a door 14 that is movably mounted to the cabinet 6 for movement between an opened condition and a closed condition in order to selectively open or close the access opening and that at least partially defines the interior 8 when the door 14 selectively closes the access opening of the refrigerator 12. While the refrigerating appliance is illustrated as a side-by-side, front-opening refrigerator 12, the embodiments of the present disclosure can have applicability in other refrigerating appliances, non-limiting examples of which include stacked style freezer-on-top or freezer-on-bottom refrigerators, drawer-style refrigerators or freezers, beverage coolers, free-standing refrigerators, build-in refrigerators, display refrigerators, etc.

Containers 16 can be any sort of container for holding a food substance. Containers 16 can be commercially available containers that are obtained by a user already containing a food substance, or storage containers into which a food substance is placed by a user for refrigerated storage outside of the original packaging. Containers 16 can be transparent or opaque, with any suitable level of opacity being contemplated. The food substance within the containers 16 can be any food substance, non-limiting examples of which include liquids, solids, gelatinous substances, mixtures, dry goods, etc. In an exemplary embodiment, containers 16 are used to contain food substances that are non-solid, non-limiting examples of which include milk, juices, ketchup, other condiments, mayonnaise, jellies, sauces, creams, etc.

The refrigerator 12 further comprises a control unit 18 that is operably coupled with at least one thermal imaging device 20 for monitoring the amount of a food substance that is present in at least one container 16. The control unit 18 can communicate with the at least one thermal imaging device 20 in a wired or a wireless manner, or a combination of both. The control unit 18 can be programmed to instruct the at least one thermal imaging device 20 to take an image or images of the contents of the refrigerator 12 in response to the occurrence of a predetermined trigger event, non-limiting examples of which include the opening or closing of the door 14, the door 14 remaining open for a predetermined period of time, the removal or addition of one or more containers 16, a user input or request, or a timer based trigger event. Regular variations in temperature within the refrigerator 12, even when the door 14 has not been recently opened, can result in perceptible thermal differences within the containers 16, so it can be desirable for the control unit 18 to instruct the thermal imaging device 20 to take an image or images after a predetermined amount of time has elapsed, regardless of whether or not the door 14 has been opened or closed. The control unit 18 can further be programmed by a computer program comprising a set of executable instructions to receive thermal imaging data from the at least one thermal imaging device 20, process the thermal imaging data by analyzing temperature differences of the container 16 from the thermal imaging data, and infer information about the containers 16 and the contents of the container 16, which can then be communicated to the user, including the output of an amount indicator indicative of the amount of a food substance in the container. The control unit 18 that performs the thermal imaging data processing and analysis can be, by way of non-limiting example, a thermal imaging device controller, a refrigerating appliance controller, a combination of both, or a cloud-based controller.

Any suitable number of thermal imaging devices 20 can be provided within the refrigerator 12, from a single thermal imaging device 20 to a plurality of thermal imaging devices 20 that can be arranged throughout the refrigerator 12. The at least one thermal imaging device 20 can be placed on the door of the refrigerator 12, on the side walls or the rear wall of the refrigerator 12, or in any suitable location either within the refrigerator 12 or located on the refrigerator 12 or the door 14 such that the thermal imaging device 20 can obtain an image of the contents of the refrigerator 12. The thermal imaging devices 20 can be positioned such that they are aligned with a predetermined area within the refrigerator 12 in order to perform thermal imaging on only containers 16 that are located within the predetermined area of the refrigerator 12, or the thermal imaging devices 20 can be positioned such that thermal imaging can be performed on containers 16 at any location throughout the refrigerator 12. In the case that only a predetermined area of the refrigerator 12 are capable of being thermally imaged by the thermal imaging devices 20, non-limiting examples of such a predetermined area can include a single shelf or specific shelves of the refrigerator 12, or only containers 16 that are located within shelves located on the door 14 of the refrigerator 12. The predetermined area can be predefined to receive containers 16 having specific desired contents. The specific desired contents can be, by way of non-limiting example, programmably defined either by the appliance or according to a preference of a user, such as by a user interface that allows a user to designate an area as being associated with containers 16 having specific desired contents.

The thermal imaging device 20 can be any suitable device capable of detecting a thermal profile or thermal inertia of the contents of a container 16. Non-limiting examples of such a suitable thermal imaging device 20 include thermal cameras, thermal sensors, or infrared thermal imaging devices such as infrared cameras such as forward looking infrared (FLIR) cameras, or infrared sensor arrays.

Figure 2A:
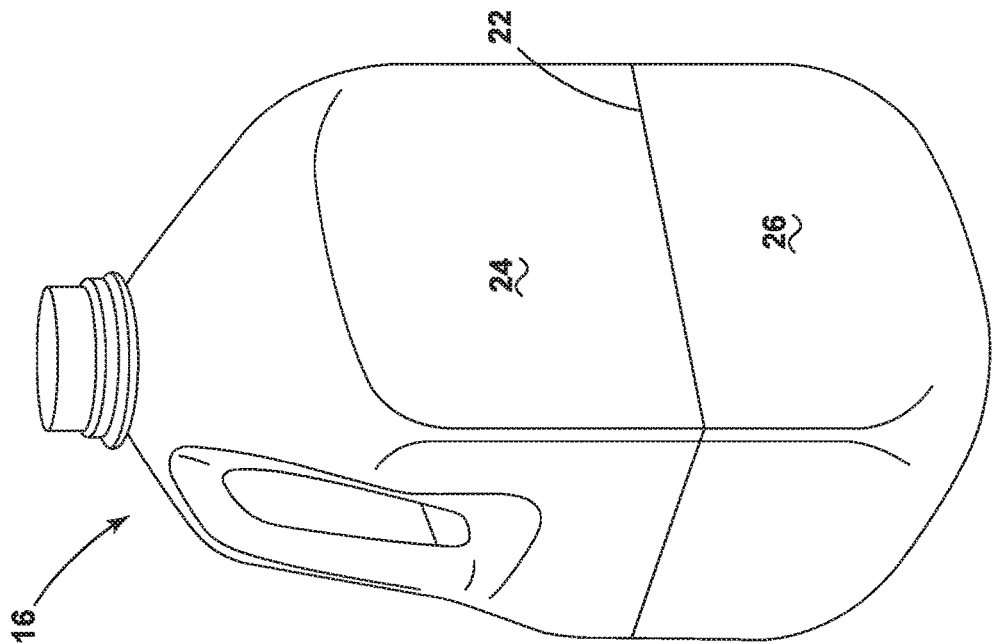
FIGS. 2A and 2B illustrate schematic representations of containers that can be placed within the refrigerating appliance of FIG. 1 in accordance with the present disclosure.

FIG. 2A illustrates a schematic view of a container 16 that can be imaged by the thermal imaging device 20 in order to monitor the amount of food substance remaining within the container 16. A fill level 22 represents the amount of the food substance present within the container 16. The fill level 22 defines both a filled portion 26 of the container 16, as well as an unfilled portion 24 of the container 16. In the container 16 shown in FIG. 2A, the container 16 is nearly completely full.

Figure 2B:
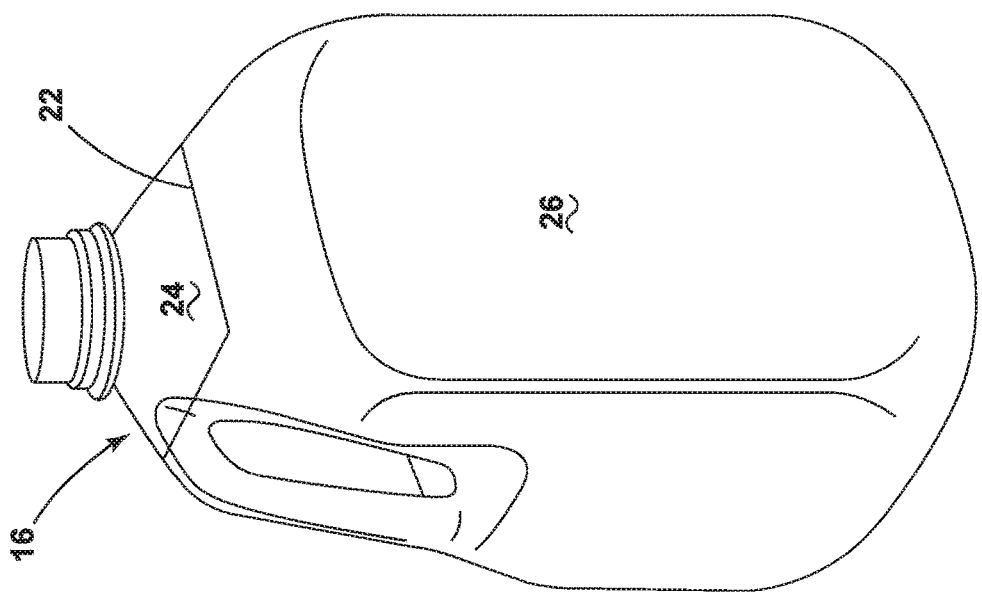

FIG. 2B illustrates a schematic view of a container 16 that is only partially full of a food substance. The fill level 22 is lower than shown in FIG. 2A, defining a smaller filled portion 26 and a larger unfilled portion 24 of the container 16, as compared to the container 16 illustrates in FIG. 2B.

Figure 3:
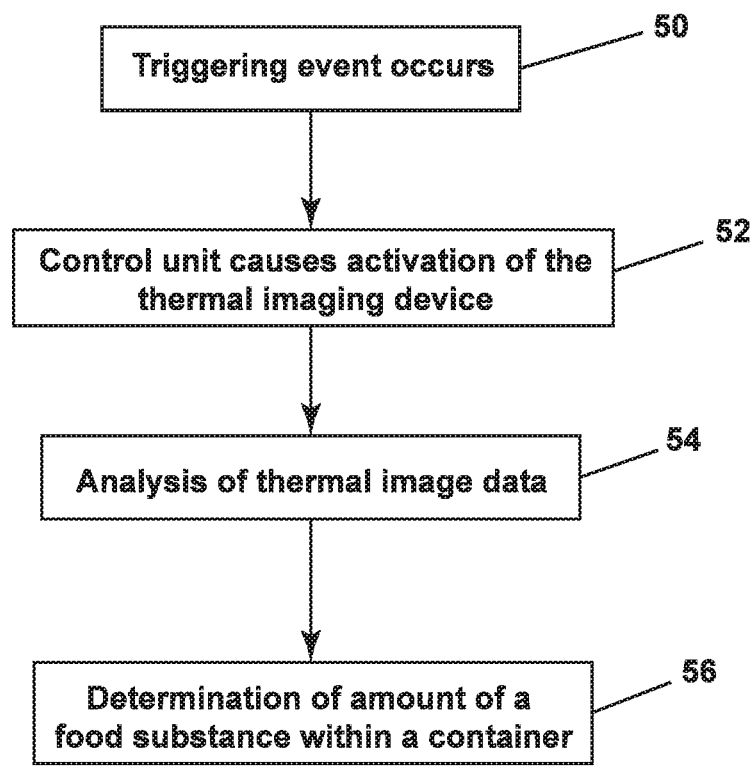
FIG. 3 illustrates a flowchart depicting exemplary steps and procedures related to a contents monitoring system for assessing the contents of the container of FIG. 2 in accordance with the present disclosure.

Turning now to the operation of the contents monitoring system wherein the containers 16 are subject to thermal imaging by the thermal imaging device 20, FIG. 3 illustrates a flow chart outlining the steps of operation of the control unit 18 and the thermal imaging device 20. First, at step 50, a triggering event occurs. In an exemplary embodiment, the triggering event can be the closing of the door 14 of the refrigerator 12, regardless of whether or not any containers 16 or other contents of the refrigerator 12 are actually touched or moved. It is also contemplated that the triggering event can be the activation of a sensor that indicates the presence of at least one container 16 within a predetermined area of the refrigerator 12. Non-limiting examples of such sensors can include a capacitive sensor to identify the presence of a container 16 or a visual imaging device that recognizes the presence or absence of a container 16 and can identify when the container 16 has been removed or replaced within the refrigerator 12. When the door 14 is closed, the control unit 18 causes the thermal imaging device 20 to be activated, at step 52, and to take a thermal image of at least a portion of the contents of the refrigerator 12, which can include at least one container 16. The thermal imaging data captured in the thermal image generated by the thermal imaging device 20 can then be analyzed, at step 54. This analysis can be performed by the control unit 18, or can be performed as part of the function of the thermal imaging device 20 itself, or by a separate processor, wherein any of the options for the analysis can be locally available as a part of the refrigerator 12, or can be a cloud-based service. The analysis of the thermal image data can then be used to determine the location of the fill level 22, at step 56, and thus to infer the amount of a food substance remaining within the container 16.

This analysis and determination of amount of a food substance within the container 16 is possible because the filled portion 26 and the unfilled portion 24 of the container 16 have differing thermal inertias. Thermal inertia is defined as the rate of change in temperature at which the temperature of a substance approaches that of its surroundings. The thermal inertia of a substance is dependent upon the absorptivity of the substance, the specific heat of the substance, the thermal conductivity of the substance, the dimensions and/or volume of the substance, and other factors. The food substance within the filled portion 26 and the air within the unfilled portion 24 have differing thermal inertias, and thus will change temperature at different rates when, for example, the door 14 of the refrigerator 12 is opened, or when the container 16 is removed from the refrigerator 12 for a period of time. Even if the door 14 is opened only for a few seconds, the temperature of the filled portion 26 and the unfilled portion 24 can differ by 1-2° C.

For example, if the door 14 of the refrigerator 12 is opened for several seconds, and then closed, the thermal imaging device 20 is activated and a thermal image is obtained of the container 16 as shown in FIG. 2A. The unfilled portion 24 could have a temperature of, for example, 8° C., while the filled portion 26 can have a temperature of 6° C. The control unit 18 can interpret the thermal image data and infer that the fill level 22 is at the junction between the 6° C. filled portion 26 and the 8° C. unfilled portion 24, and can subsequently register that the container 16 is nearly full. The determination of the amount remaining in the container 16 can be presented, by way of non-limiting example, as a quantitative amount, such as percent full (i.e. 95% full) based on the percentage of the visual area of the container 16 that is at a first temperature versus the percentage of the visual area of the container 16 that is at a second, differing temperature from the first. The determination of the amount remaining in the container 16 can also or alternately be presented as a qualitative amount such as, by way of non-limiting example, full, half-full, or nearly empty. It will also be understood that a user can set the indications to be received, and the manner in which they are presented, whether it be qualitative or quantitative. In the case of the container 16 illustrated in FIG. 2B, the control unit 18 would recognize that a smaller percentage of the container 16 is at the lower temperature, indicating that the fill level 22 of the container 16 in FIG. 2B is much lower than the fill level 22 of the container 16 in FIG. 2A.

The determination of the amount remaining in the container 16 can be accomplished, by way of non-limiting example, by determining a ratio of the filled portion 26 and the unfilled portion 24 or by comparing the size of the filled portion 26 or the unfilled portion 24 to the overall size of the container 16. In the case that the thermal imaging device 20 is used to generate thermal imaging data of a predetermined area of the refrigerator 12 in which a container 16 of predetermined shape or volume is placed, the area of the filled portion 26 or the unfilled portion 24 can be compared to a known reference value of the size or volume of the container 16 of predetermined shape or predetermined volume. The area of the filled portion 26 and/or the unfilled portion 24 can be determining by a variety of thermal imaging data analysis techniques, including, by way of non-limiting example, pixel counting.

Once the control unit 18 has determined the amount of food substance remaining in the container 16, which can be expressed, for example, as a percent fullness, the control unit 18 can further be programmed to report to a user of the refrigerator 12 when the percent fullness has met or exceeded a predetermined threshold. For example, the control unit 18 can cause a message to be displayed to a user, either on a display on the refrigerator 12 or by communication with another electronic device accessible by the user, non-limiting examples of which can include a computer, mobile phone, tablet, e-mail account, or an electronic device application, such as one that generates a shopping list, that the percent fullness for a particular container 16 has reached or is below, for example, 25% full, as described at steps 58, 60 in FIG. 4. The predetermined fullness threshold at which a user would be notified can be set according to the preference of a user, as a user-definable threshold, or the threshold can be defined by the refrigerator 12.

Figure 4:
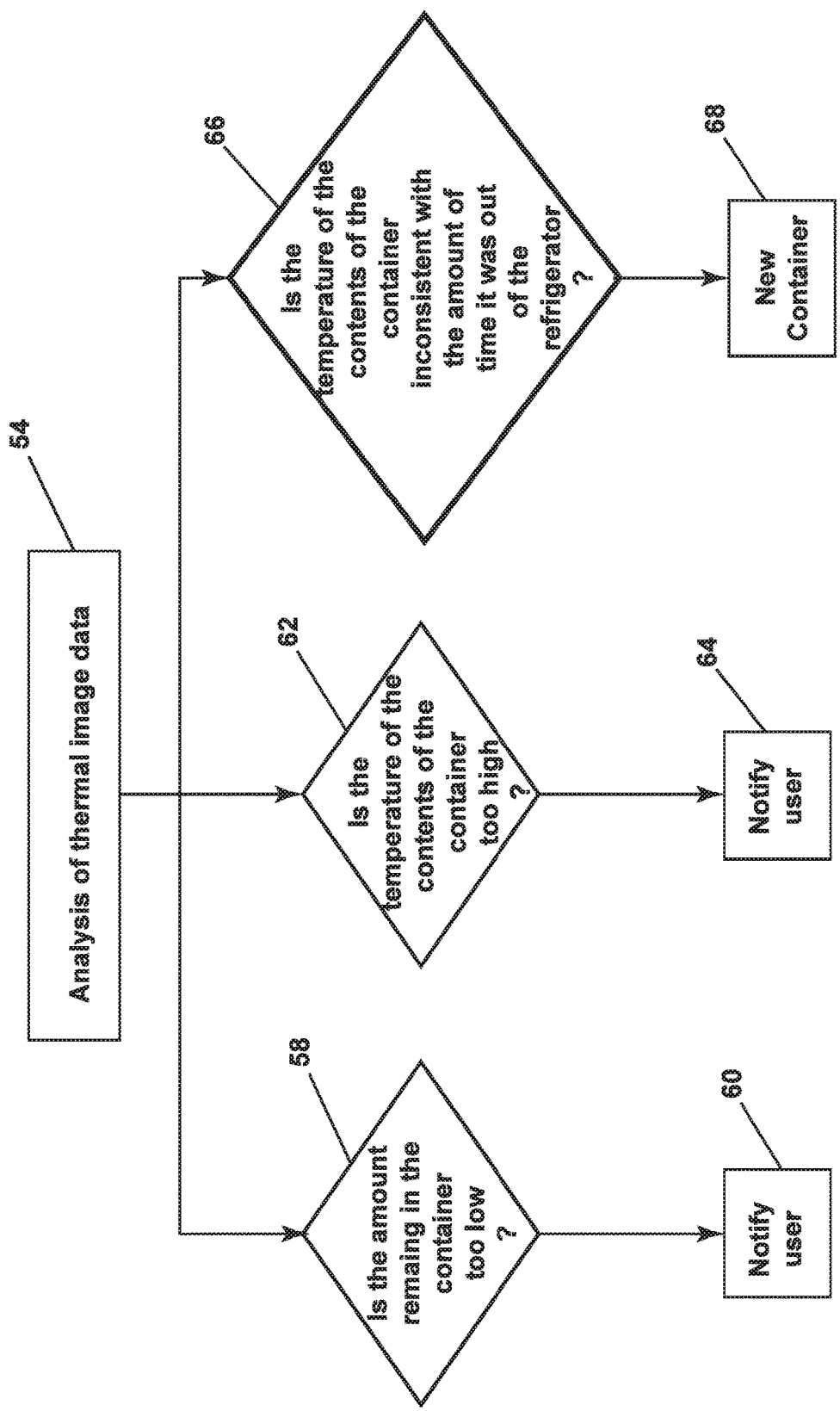
FIG. 4 illustrates a flowchart depicting exemplary steps and procedures related to a contents monitoring system that provides notifications to a user based on the assessment of the contents as illustrated in FIG. 3 in accordance with the present disclosure.

In addition to monitoring an amount or percent of a food substance remaining in a container 16 and providing information to a user on the amount of the food substance remaining in the container 16, additional information relating to the status of a container 16 and the contents can be gathered from the use of the thermal imaging device 20 and resulting thermal imaging data, as illustrated in FIG. 4. For example, if the control unit 18 determines from the thermal imaging data received from the thermal imaging device 20 that the temperature of the filled portion 26 has met or exceeded a predetermined threshold at step 62, for example because the container 16 was left outside of the refrigerator 12 for too long before being placed back into the refrigerator 12, the control unit 18 can determine that the contents of the container 16 have gotten too warm and may be spoiled and notify the user at step 64 of the undesirably high temperature of the container 16.

It is also contemplated that the contents monitoring system can be employed along with a transactional contents monitoring feature, for example that tracks when a specific container 16 was placed within the refrigerator 12, to provide further useful information to the user. For example, if the control unit 18 receives information that a specific container 16 has been removed from the refrigerator 12 and an identically shaped container 16 is replaced less than a minute later, but the new container 16 is 20° C. warmer than the container 16 that was removed from the refrigerator 12 less than a minute before, the control unit 18 can infer that the newly placed container 16 must be a new container 16, rather than the same container 16, because the temperature change is too great to have occurred during the time the container 16 was removed from the refrigerator 12, as described at steps 66, 68.

In a household kitchen, particularly when children have access to the kitchen, it may be difficult to regulate or keep track of the removal of food substances from containers. In a commercial kitchen including multiple food preparers rapidly preparing dishes, the task of tracking the amounts of food substances in numerous containers can be even more challenging. A refrigerator with an improved system for monitoring the quantity of remaining food substance contents within containers in the refrigerator can save on production costs and complexity of the refrigerator, improve user experience with the appliance, and provide a number of benefits for the user, such as facilitating more informed food consumption and food purchase decisions.

The refrigerator contents monitoring system as described herein allows for a user to easily ascertain the amount of a food substance remaining in a container, without the necessity of having specific sensors associated with each container. Moreover, the system can function both with commercial containers, as well as with temporary storage containers that are filled by the user and placed within the refrigerator. The system will also function properly regardless of whether the containers are transparent or opaque, and can be used to monitor containers either that are placed in a specific position within the fridge, or can be used to monitor containers throughout the body of the refrigerator. In addition, a great variety of different food substances within containers can be monitored in this way. The system can be employed to notify a user when a quantity of a specific food substance is getting low, when a container with a food substance may have been left out too long and is no longer safe for consumption, and also to identify when an old container may have been replaced with a new container. Thus, a single type of thermal imaging device can be used to support a variety of functions to provide additional useful information to users of the refrigerator.

While the use of the thermal imaging device has been described herein within the context of a refrigerating appliance, it will be understood that the disclosure is applicable to any appliance for the storage of food substances in which the temperature is regulated or stored at a temperature different from the external environment of the appliance, whether the appliance stores the food substances at a temperature that is lower or higher than the external environment. Non-limiting examples of such an appliance for the storage of food substances include a storage or refrigerating cabinet, a storage or refrigerating drawer, a beverage storing appliance, such as for wine, spirits, liqueurs, etc., or a wine cellar.

To the extent not already described, the different features and structures of the various embodiments can be used in combination with each other as desired. That one feature may not be illustrated in all of the embodiments is not meant to be construed that it cannot be, but is done for brevity of description. Thus, the various features of the different embodiments can be mixed and matched as desired to form new embodiments, whether or not the new embodiments are expressly described. All combinations or permutations of features described herein are covered by this disclosure.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A refrigerating appliance for monitoring a container storing a substance, the refrigerating appliance comprising:
   a thermal imaging device configured to capture thermal image data of the container, the container being located within an interior of the refrigerating appliance; and
   a control unit configured to receive the thermal image data and programmed to
      identify, according to a temperature difference in the thermal image data, at least one of a filled portion or an unfilled portion of the container,
      compare an area of at least one of the filled portion or the unfilled portion to a reference value indicative of a predetermined shape or volume of the container to identify an amount of the substance in the container, and
      output an amount indicator indicative of the amount of the substance in the container.

2. The refrigerating appliance of claim 1, wherein the interior includes a predetermined area that is configured to receive containers having the predetermined shape or volume.

3. The refrigerating appliance of claim 1, wherein the amount indicator is a percent fullness of the container.

4. The refrigerating appliance of claim 3, wherein the percent fullness of the container is based on a percentage of a visual area of the container in the thermal image data that is at a first temperature versus a percentage of the visual area of the container in the thermal image data that is at a second, different temperature from the first temperature.

5. The refrigerating appliance of claim 1, wherein the amount indicator indicates whether a fullness level of the container is above or below a predetermined threshold.

6. The refrigerating appliance of claim 5, wherein the predetermined threshold is a user-defined threshold.

7. The refrigerating appliance of claim 5, wherein the predetermined threshold is defined by the refrigerating appliance.

8. The refrigerating appliance of claim 1, wherein the control unit is one of a thermal imaging device controller or a refrigerating appliance controller.

9. The refrigerating appliance of claim 1, wherein the thermal imaging device is an infrared thermal imaging device.

10. The refrigerating appliance of claim 1, wherein the thermal imaging device is a forward looking infrared (FLIR) camera.

11. The refrigerating appliance of claim 1, wherein the thermal imaging device is activated responsive to movement of a door of the refrigerating appliance from an opened position to a closed position.

12. The refrigerating appliance of claim 1 wherein the thermal imaging device is activated when a predetermined amount of time has elapsed.

13. The refrigerating appliance of claim 1 wherein the refrigerating appliance is one of a refrigerator, a refrigerating cabinet, a refrigerated drawer, a beverage refrigerating appliance, or a temperature-controlled wine cellar.

14. A method of monitoring a container within a refrigerating appliance and storing a substance, the method comprising:
    generating, with a thermal imaging device, thermal image data of the container within the appliance;
    identifying, according to a temperature difference in the thermal image data, at least one of a filled portion or an unfilled portion of the container;
    comparing an area of at least one of the filled portion or the unfilled portion to a reference value indicative of a predetermined shape or volume of the container to identify an amount of the substance in the container; and
    outputting an amount indicator indicative of the amount of the substance in the container.

15. The method of claim 14, further comprising capturing the thermal image data of a predetermined area of the refrigerating appliance that is configured to receive containers having the predetermined shape or volume.

16. The method of claim 14, wherein the amount indicator is a percent fullness of the container.

17. The method of claim 16, wherein the percent fullness of the container is based on a percentage of a visual area of the container in the thermal image data that is at a first temperature versus a percentage of the visual area of the container in the thermal image data that is at a second, different temperature from the first temperature.

18. The method of claim 14, wherein the amount indicator indicates whether a fullness level of the container is above or below a predetermined threshold.

19. The method of claim 18, wherein the predetermined threshold is a user-defined threshold.

20. The method of claim 18, wherein the predetermined threshold is defined by the appliance.

21. The method of claim 14, further comprising activating the thermal imaging device responsive to movement of a door of the appliance from an opened position to a closed position.

22. The method of claim 14, further comprising activating the thermal imaging device responsive to a predetermined amount of time having elapsed.

* * * * *